(12) United States Patent
Unger

(10) Patent No.: US 7,715,543 B2
(45) Date of Patent: May 11, 2010

(54) METHOD FOR VERIFYING TELEPHONE CALL BACK INFORMATION FOR RETURN CALLS WHICH ARE INITIATED VIA THE INTERNET

(75) Inventor: Stefan Unger, Unterhaching (DE)

(73) Assignee: Siemens Aktiengesellschaft, Munich (DE)

( * ) Notice: Subject to any disclaimer, the term of this patent is extended or adjusted under 35 U.S.C. 154(b) by 459 days.

(21) Appl. No.: 10/240,418

(22) PCT Filed: Jan. 30, 2002

(86) PCT No.: PCT/EP02/00972

§ 371 (c)(1),
(2), (4) Date: Oct. 1, 2002

(87) PCT Pub. No.: WO03/005642

PCT Pub. Date: Jan. 16, 2003

(65) Prior Publication Data

US 2003/0142806 A1    Jul. 31, 2003

(30) Foreign Application Priority Data

Feb. 2, 2001    (EP) .................................. 01102418

(51) Int. Cl.
*H04M 3/42*    (2006.01)
*H04M 3/00*    (2006.01)
*H04M 5/00*    (2006.01)

(52) U.S. Cl. ............................ 379/210.01; 379/265.02; 379/265.09; 370/352

(58) Field of Classification Search ............ 379/210.01, 379/209.01, 215.01, 114.01, 265.09, 265.02; 455/3.02; 725/60; 709/248, 227, 229, 230; 370/467, 352

See application file for complete search history.

(56) References Cited

U.S. PATENT DOCUMENTS

| | | | |
|---|---|---|---|
| 5,901,284 A | | 5/1999 | Hamdy-Swink |
| 6,084,953 A | * | 7/2000 | Bardenheuer et al. .. 379/114.01 |
| 6,169,795 B1 | * | 1/2001 | Dunn et al. ............ 379/209.01 |
| 6,259,891 B1 | * | 7/2001 | Allen ........................ 455/3.02 |
| 6,463,144 B1 | * | 10/2002 | Dunn et al. ............ 379/210.01 |
| 6,526,043 B1 | * | 2/2003 | Fogelholm et al. .......... 370/352 |
| 6,724,878 B2 | * | 4/2004 | Burg ..................... 379/215.01 |
| 7,076,554 B1 | * | 7/2006 | Kobayashi .................. 709/227 |
| 2002/0041605 A1 | * | 4/2002 | Benussi et al. .............. 370/467 |
| 2002/0112241 A1 | * | 8/2002 | Cocchi et al. .................. 725/60 |
| 2002/0143968 A1 | * | 10/2002 | Banerjee et al. ............. 709/230 |
| 2003/0131115 A1 | * | 7/2003 | Mi et al. ..................... 709/229 |
| 2004/0039846 A1 | * | 2/2004 | Goss et al. .................. 709/248 |
| 2005/0220289 A1 | * | 10/2005 | Reding et al. .......... 379/265.09 |

FOREIGN PATENT DOCUMENTS

| | | |
|---|---|---|
| EP | 1 059 798 | 12/2000 |
| WO | WO 00/44148 | 7/2000 |

* cited by examiner

*Primary Examiner*—Thjuan K Addy
(74) *Attorney, Agent, or Firm*—King & Spalding L.L.P.

(57) ABSTRACT

According to the inventive method, call back information is transmitted to a telephone network via an internet terminal using a click-to-dial service. In order to verify the information, the telephone network extracts internet terminal specific information from the access server via the internet. After comparing the call number information which is contained in the call back information and in the internet terminal specific information, the return call is initiated or suppressed. Return calls to subscribers who do not want to be called are thus suppressed.

20 Claims, 2 Drawing Sheets

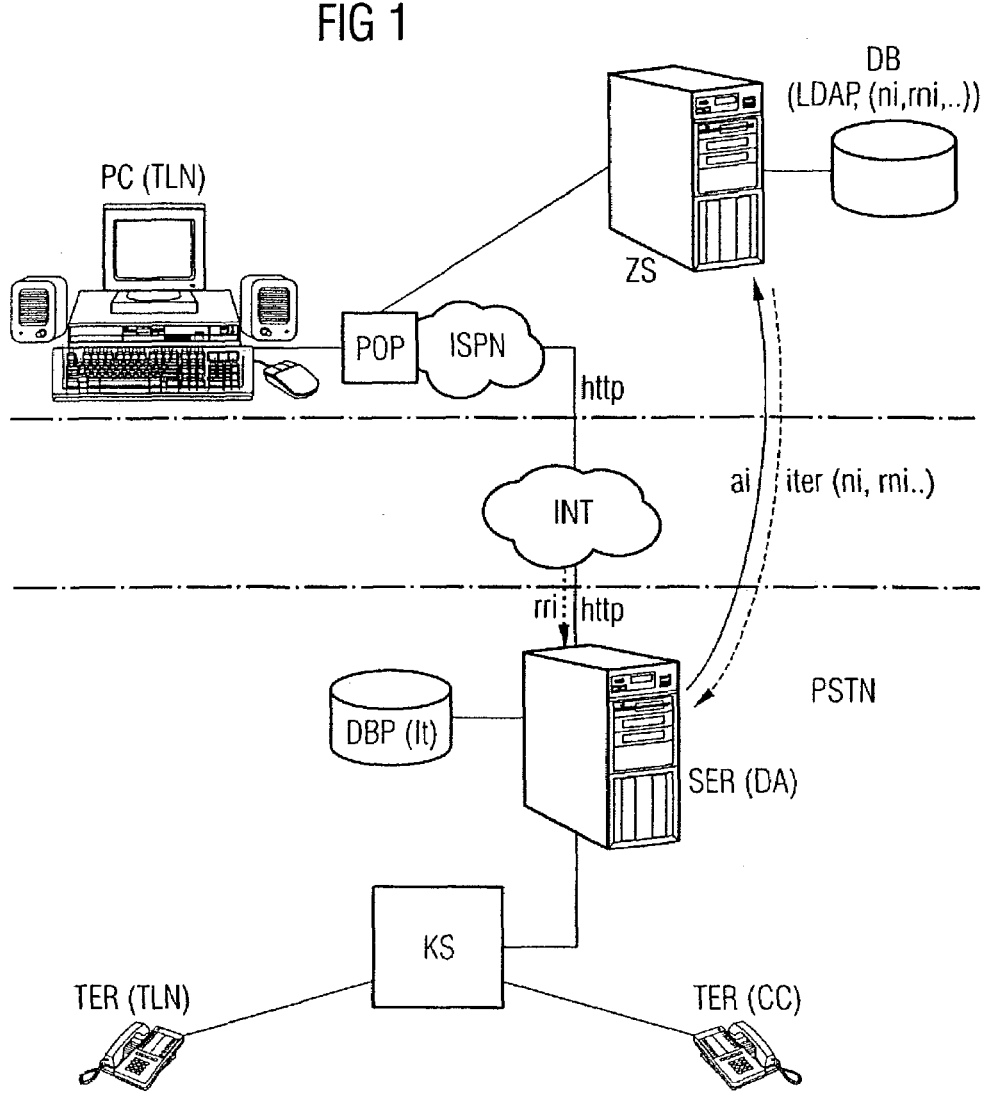

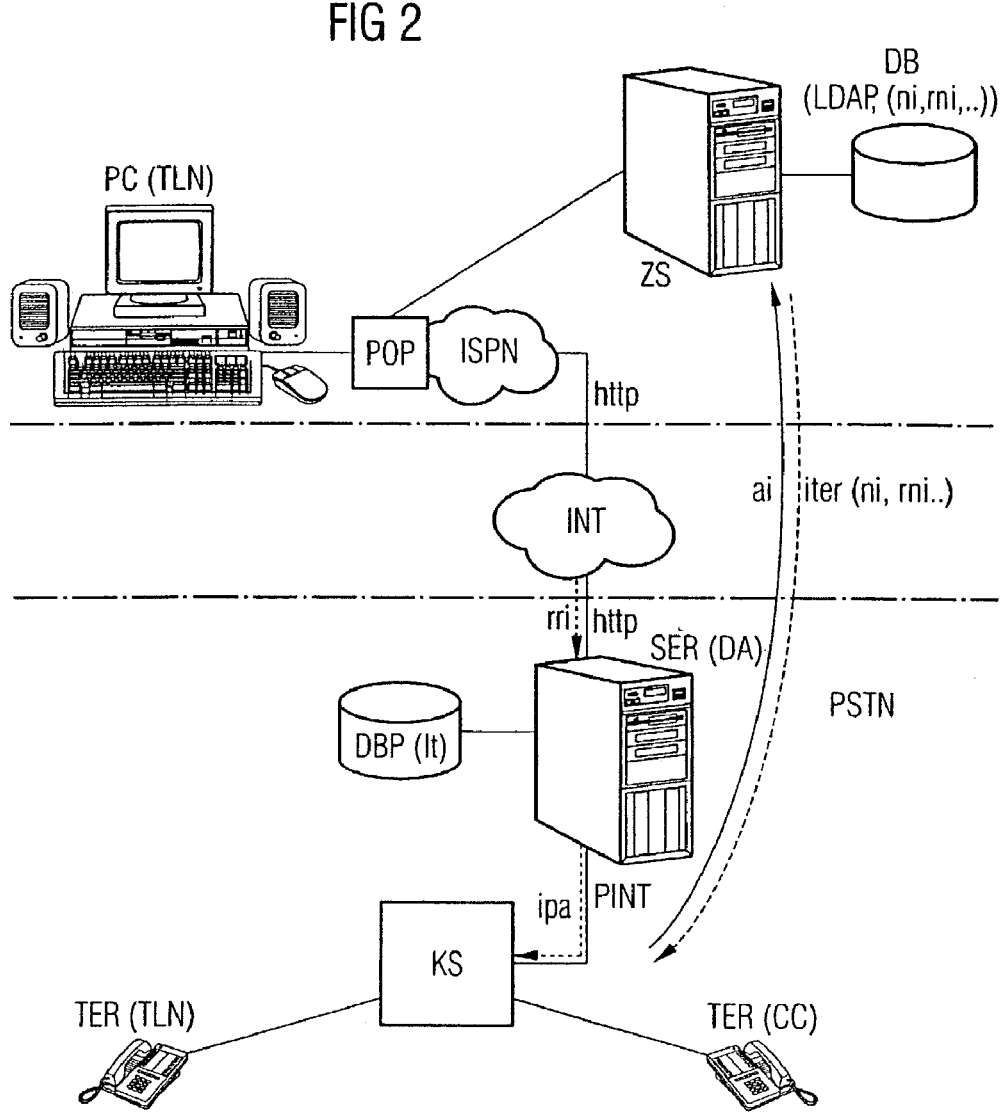

METHOD FOR VERIFYING TELEPHONE CALL BACK INFORMATION FOR RETURN CALLS WHICH ARE INITIATED VIA THE INTERNET

CLAIM FOR PRIORITY

This application is a U.S. National Stage Application of International Application No. PCT/EP02/00972 filed Jan. 30, 2002, which designates the United States of America, and claims priority to EP Application No. 01102418.9 filed Jun. 29, 2001, the contents of which are hereby incorporated by reference in their entirety.

TECHNICAL FIELD OF THE INVENTION

The invention relates to a method for verification of callback information for return calls initiated via the Internet.

BACKGROUND OF THE INVENTION

Internet services are currently widely used in which it is possible to use the Internet to initiate a return call, which is normally not at the expense of the customer. Examples of these Internet services include click-to-dial applications, wake-up calls activated via the Internet, and conferences activated via the Internet.

When a request is made for a telephone return call, the call number of one's own connection must be stated. Return calls which are activated incorrectly by stating incorrect information face unnecessary loads, in a manner similar to misuse, on the switching and transmission resources in the communications networks and with the service provider. As a result, terminals and their users are called back who do not wish to be called back. Furthermore, in the case of services where the customer bears the costs, for example for an R call, the service provider will incur additional costs for incorrectly routed calls. In addition, attention must be paid to legal protection and to the reliability of the callback information in order, for example, to avoid repeated undesired return calls.

One precaution against such misuse is to restrict the risk of false details by previous registration or subscription of the subscribers. However, this solution does not allow immediate use of the service by any given Internet users and would therefore prevent customers from using the service. For example, click-to-dial services, which provide for immediate use by any given customers, would be impossible.

SUMMARY OF THE INVENTION

The invention relates to a method for verification of callback information, by means of which a PSTN return call by an Internet service provider is initiated by an Internet terminal, with the Internet connection being controlled by an access server.

The invention discloses a simple method for protection against misuse of callback services by stating incorrect callback information, which does not need the customer to register in advance with the service provider.

In one embodiment of the invention, a currently associated IP address of the respective Internet terminal is recorded in the server of the service provider, and the access server is identified on the basis of the IP address. The server of the service provider then transmits an Internet-terminal-specific request to the access server. In response to the request, Internet-terminal-specific information is determined in the access server, and is transmitted to the requesting server. Finally, the information transmitted by the access server is used to verify the callback information, and a return call is initiated or is prevented as a function of the verification result.

The embodiment allows the stated callback information to be verified without previous registration of the Internet terminal or of its user. Any nuisance sources are identified at an early stage, and nuisance calls are prevented in the server itself. The invention can therefore be used even for click-to-dial services, which provide for immediate use by any given customers.

In another embodiment according to the invention, the currently associated IP address of the respective Internet terminal is recorded in the server of the service provider, and is passed on by the server of the service provider to the communications system, where the access server is identified on the basis of the IP address. The communications system of the service provider then transmits an Internet-terminal-specific request to the access server. In response to the request, Internet-terminal-specific information is determined in the access server and is transmitted to the requesting communications system. Finally, the information transmitted by the access server is used to verify the callback information, and a return call is initiated or prevented as a function of the verification result. An additional advantage of the according to the invention is that the load on the server of the service provider is reduced both dynamically and in terms of the memory requirement.

In still another embodiment according to the invention, callback information is entered in a list of incorrect information items if the verification result is negative. The list is used to compare the callback information entered by Internet terminals with the incorrect information stored in the list, and to prevent the return call if the entered callback information matches incorrect information stored in the list. This list represents a negative list of potential nuisance sources. Creating a list such as this has the advantage that potential nuisance sources can be identified directly with the aid of this list, without any further request to the access server. This procedure is more efficient and requires less memory space than the storage of the investigated terminal-specific information.

BRIEF DESCRIPTION OF THE DRAWINGS

The invention will be explained in more detail in the following text with reference to figures as an exemplary embodiment, in which:

FIG. 1 shows an implementation according to one embodiment of the invention.

FIG. 2 shows another embodiment according to the invention.

In this case, identical designations denote identical elements.

DETAILED DESCRIPTION OF THE PREFERRED EMBODIMENTS

FIGS. 1 and 2 shows an arrangement of elements which are used to implement a click-to-dial (CtD) service—which is referred to as a CtD service in the following text.

For access to the Internet INT, the Internet service provider provides an Internet service provider network ISPN with an AAA (Authentication, Authorization, Accounting) access server ZS and a databank DB(LDAP) which can be activated via the LDAP (Lightweight Directory Access Protocol). An Internet terminal PC(TLN), for example a personal computer, can be connected to the Internet INT via the Internet service provider network ISPN. One precondition for the use of the access server ZS is previous registration of the Internet terminal PC(TLN). The access server ZS normally registers name information ni, call number information rni (which may comprise, for example, a telephone number or calling line identity (CLI) or an ISDN address) and address information. A service provider for a CtD service provides a server SER (DA), which is connected to the Internet INT. The server of the service provider, SER(DA) is also connected to a telephone network PSTN, which is also referred to as a PSTN (public switched telephone network). A call can be switched via a communications system KS, for example a switching center, an exchange or a private branch exchange, from a system TER(CC), which is provided by the service provider for this purpose, for example a call center, announcement device, to the terminal TER(TLN) of a customer or subscriber. The subscriber-end terminal TER(TLN) may be a telephone or a fax machine.

In the case of a CtD service, an Internet terminal PC(TLN) uses the Internet INT to initiate a PSTN return call, which is normally not at the expense of the subscriber TLN, via the telephone network PSTN. When using a CtD service, the Internet terminal PC(TLN) is connected to the Internet INT via the access server ZS. The Internet terminal PC(TLN) uses the Internet INT to send callback information rri to the server of the service provider SER(DA), thus requesting a return call. This callback information rri includes at least call number information ri, and, optionally, name information ni. The call number information ri generally represents a telephone number or a fax number. The callback information rri which is transmitted to the server of the service provider SER(DA) is recorded in this server, and is passed to the communications system KS. From there, the system TER(CC) initiates a return call to the customer-end terminal TER(TLN).

The associated, currently valid IP address is extracted in the server of the service provider SER(DA) from the callback information rri which is transmitted by the Internet terminal PC(TLN). In the case of a message in the HTTP format, the IP address can be read from the TCP/IP header of the message. The access server ZS used by that Internet terminal PC(TLN) is identified from a predetermined part of the IP address. The server of the service provider SER(DA) uses the Internet Protocol to transmit Internet-terminal-specific request information ai to the access server ZS, thus making a request for Internet-terminal-specific information iter(ni,rni, . . . ) (FIG. 1). In the application example, the Internet-terminal-specific information iter(ni,rni, . . . ) such as name information ni, call number information rni, address information, etc., is stored in the LDAP databank DB(LDAP, (ni,rni, . . . )) which is connected to that access server ZS. The request from the server of the service provider SER(DA) is aimed at relevant Internet-terminal-specific information inter(ni,rni, . . . ), for example name information ni and call number information rni, which has been specified for registration of the Internet terminal PC(TLN). The requested Internet-terminal-specific information iter(ni,rni, . . . ) is sent via the Internet INT to the server of the service provider SER(DA), where an Internet-terminal-specific data record lt, which is also referred to as a logging ticket in the specialist world, is created, and is likewise stored in an LDAP databank DBP(lt). This data record lt may, for example, include the call number information rni required for transmission of the return call, name information ni, address information and the IP address which is used for identification of the access server. One precondition in this case is that an authorization has been agreed in advance to allow access to the requested information. If no call number information rni has been recorded on registration, the call number information rni associated with the name information ni can also be determined in the server of the service provider SER(DA) by means of an electronically stored name/call number directory. The callback information rri emitted via the Internet is compared with the Internet-terminal-specific data record lt, and is checked for a match. Depending on the result of the verification of the callback information rri, the server of the service provider SER(DA) then transmits a callback message rrn to the communications system KS, as a result of which the return call is initiated, or prevents the transmission of a callback message rrn, as a result of which the initiation of the return call is prevented.

As an alternative to this implementation, the request for Internet-terminal-specific information iter(ni,rni, . . . ) may also be made from the communications system KS of the service provider (FIG. 2). In this case, the IP address ipa which is associated with that Internet terminal PC(TLN) is also determined by the server of the service provider SER (DA) from the TCP/IP header of the message which has been sent in order to state the callback information rri. The IP address is then passed to the communications system KS which provides the switching functions for setting up and making PSTN return calls. An extension to the communication protocol which controls the data transmission between the server of the service provider SER(DA) and the communications system KS may be required in order to pass on the IP address. By way of example, the PSTN/Internet Interworking Protocol may be used—indicated by the designation PINT in FIG. 2. The method is then continued analogously to the first exemplary embodiment, with the difference that the communications system KS carries out the functions of the server of the service provider SER(DA) when requesting Internet-terminal-specific information iter(ni,rni, . . . ), in the determination of this information and in the verification of the callback information rri. Depending on the verification result, the communications system KS initiates or prevents a return call by the system TER(CC) which is provided for this purpose.

The invention is not restricted to the exemplary embodiments but may also be used in other network configurations, for example with ISPN networks and data networks, in which a return call is initiated via the Internet. The callback information may also be verified in other network components in the communications networks PSTN, ISDN etc.

The invention claimed is:

1. A method for verification of callback information such that a PSTN return call by an Internet service provider is requested by an Internet terminal, an Internet connection being controlled by an access server, comprising:
   upon requesting said PSTN return call, recording by a server of the service provider a currently associated IP address of the Internet terminal, and identifying the access server by the server of the service provider based on the IP address;
   transmitting an Internet-terminal-specific request to the access server via the server of the service provider;
   determining Internet-terminal-specific information in the access server and transmitting the information to the requesting server of the service provider, wherein
   the information transmitted by the access server is used to verify the callback information by comparing the callback information with the Internet-terminal-specific information; and
   initiating or preventing a return call as a function of the verification.

2. A method for verification of callback information such that a PSTN return call by an Internet service provider is initiated by an Internet terminal, wherein an Internet connection is controlled by an access server, which is connected to a communications system, which provides the switching functions for setting up and making PSTN return calls, comprising:

upon initiating said PSTN return call, recording by a server of the service provider a currently associated IP address of the Internet terminal;

passing the IP address to the communications system via the server of the service provider, wherein the access server is identified on the basis of the IP address;

transmitting an Internet-terminal-specific request to the access server via the communications system of the service provider;

determining an Internet-terminal-specific information in the access server and transmitting the information to the requesting communications system; and using the information transmitted by the access server to verify the callback information;

initiating or preventing a return call as a function of the verification result.

3. The method as claimed in claim 1, wherein the callback information is entered in a list of incorrect information items if the verification is negative, the callback information entered by Internet terminals is compared with the incorrect information stored in the list, and if the entered callback information matches incorrect information stored in the list, the return call is prevented.

4. The method as claimed in claim 1, wherein the terminal-specific information is represented by call number information and/or by name information, wherein the callback information is formed by call number information and as an option by name information, and the call number information comprises a telephone number or a fax number.

5. The method as claimed in claim 4, wherein at least one of the Internet-terminal-specific information is compared with the callback information, and if the call number information matches, a return call is initiated with the aid of the telephone number or of the fax number via the PSTN and, if it does not match, the return call is prevented.

6. The method as claimed in claim 4, wherein the Internet-terminal-specific information determined in the access server includes name information but no call number information, and the call number information is determined with the aid of an electronically stored name/call number directory.

7. The method as claimed in claim 2, wherein the communication protocol which controls the data transmission between the server of the service provider and the communications system is extended for the Internet-terminal-specific request.

8. The method as claimed in claim 1, wherein the Internet-terminal-specific information which is emitted by the access server for registration of the Internet terminal is stored in an additional server and is read by means of an LDAP protocol, and the additional server is accessed directly with the aid of the LDAP protocol by the server of the service provider or by the communications system, and the Internet-terminal-specific information is requested and transmitted.

9. The method as claimed in claim 2, wherein the callback information is entered in a list of incorrect information items if the verification is negative, the callback information entered by Internet terminals is compared with the incorrect information stored in the list, and if the entered callback information matches incorrect information stored in the list, the return call is prevented.

10. The method as claimed in claim 2, wherein the terminal-specific information is represented by call number information and/or by name information, wherein the callback information is formed by call number information and as an option by name information, and the call number information comprises a telephone number or a fax number.

11. The method as claimed in claim 2, wherein the Internet-terminal-specific information which is emitted by the access server for registration of the Internet terminal is stored in an additional server and is read by means of an LDAP protocol, and the additional server is accessed directly with the aid of the LDAP protocol by the server of the service provider or by the communications system, and the Internet-terminal-specific information is requested and transmitted.

12. A method for verification of callback information comprising the steps of:

requesting by an Internet terminal via an access server a PSTN return call by an Internet service provider wherein callback information is forwarded to a server of the Internet service provider;

recording by the server of the Internet service provider an IP address of the Internet terminal, identifying the access server by the server of the Internet service provider based on the IP address;

transmitting an Internet-terminal-specific request to the access server via the server of the Internet service provider;

determining Internet-terminal-specific information in the access server and transmitting the information to the requesting server of the Internet service provider, verifying the callback information by comparing the Internet-terminal-specific information with the callback information; and initiating or preventing a return call as a function of the verification.

13. The method as claimed in claim 12, wherein the callback information is entered in a list of incorrect information items if the verification is negative, the callback information entered by Internet terminals is compared with the incorrect information stored in the list, and if the entered callback information matches incorrect information stored in the list, the return call is prevented.

14. The method as claimed in claim 12, wherein the terminal-specific information is represented by call number information and/or by name information, wherein the callback information is formed by call number information and as an option by name information, and the call number information comprises a telephone number or a fax number.

15. The method as claimed in claim 14, wherein at least one of the Internet-terminal-specific information is compared with the callback information, and if the call number information matches, a return call is initiated with the aid of the telephone number or of the fax number via the PSTN and, if it does not match, the return call is prevented.

16. The method as claimed in claim 14, wherein the Internet-terminal-specific information determined in the access server includes name information but no call number information, and the call number information is determined with the aid of an electronically stored name/call number directory.

17. A method for verification of callback information comprising the steps of:

initiating by an Internet terminal via an access server a PSTN return call by an Internet service provider wherein callback information is forwarded to a server of the Internet service provider, recording by a server of the Internet service provider an associated IP address of the Internet terminal;

passing the IP address to a communications system via the server of the Internet service provider, wherein the access server is identified on the basis of the IP address;

transmitting an Internet-terminal-specific request to the access server via the communications system of the service provider;

determining an Internet-terminal-specific information in the access server and transmitting the information to the requesting communications system; and using the information transmitted by the access server to verify the callback information;

initiating or preventing a return call as a function of the verification result.

18. The method as claimed in claim 17, wherein the callback information is entered in a list of incorrect information items if the verification is negative, the callback information entered by Internet terminals is compared with the incorrect information stored in the list, and if the entered callback information matches incorrect information stored in the list, the return call is prevented.

19. The method as claimed in claim 17, wherein the terminal-specific information is represented by call number information and/or by name information, wherein the callback information is formed by call number information and as an option by name information, and the call number information comprises a telephone number or a fax number.

20. The method as claimed in claim 17, wherein the Internet-terminal-specific information which is emitted by the access server for registration of the Internet terminal is stored in an additional server and is read by means of an LDAP protocol, and the additional server is accessed directly with the aid of the LDAP protocol by the server of the service provider or by the communications system, and the Internet-terminal-specific information is requested and transmitted.

* * * * *